United States Patent
Challoner et al.

(10) Patent No.: US 7,093,486 B2
(45) Date of Patent: *Aug. 22, 2006

(54) ISOLATED RESONATOR GYROSCOPE WITH A DRIVE AND SENSE PLATE

(75) Inventors: A. Dorian Challoner, Manhattan Beach, CA (US); Kirill V. Shcheglov, Los Angeles, CA (US)

(73) Assignees: The Boeing Company, Chicago, IL (US); California Institute of Technology, Pasadena, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/051,884

(22) Filed: Feb. 4, 2005

(65) Prior Publication Data

US 2006/0070440 A1    Apr. 6, 2006

Related U.S. Application Data

(63) Continuation of application No. 10/370,953, filed on Feb. 20, 2003, which is a continuation-in-part of application No. 09/928,279, filed on Aug. 10, 2001, now Pat. No. 6,629,460.

(51) Int. Cl.
*G01N 9/04* (2006.01)

(52) U.S. Cl. .................... 73/504.12; 73/504.14

(58) Field of Classification Search ............ 73/504.02, 73/504.04, 504.12, 504.03, 504.13, 504.14, 73/504.15
See application file for complete search history.

(56) References Cited

U.S. PATENT DOCUMENTS

| | | |
|---|---|---|
| 392,650 A | 11/1888 | Watrous |
| 5,203,208 A | 4/1993 | Bernstein |
| 5,226,321 A | 7/1993 | Varnham et al. |
| 5,646,346 A | 7/1997 | Okada |
| 5,665,915 A | 9/1997 | Kobayashi et al. |
| 5,728,936 A | 3/1998 | Lutz |
| 5,783,749 A | 7/1998 | Lee et al. |
| 5,894,090 A | 4/1999 | Tang et al. |
| 5,905,202 A | 5/1999 | Kubena et al. |
| 5,920,012 A | 7/1999 | Pinson |
| 5,987,985 A | 11/1999 | Okada |
| 6,009,751 A | 1/2000 | Ljung |
| 6,044,705 A | 4/2000 | Neukermans et al. |
| 6,151,964 A | 11/2000 | Nakajima |

(Continued)

FOREIGN PATENT DOCUMENTS

DE    44 42 033 A1    5/1996

(Continued)

OTHER PUBLICATIONS

Wright et al., "The HRG Applied to a Satellite Attitude Reference System," Guidance and Control, AASAAS, 1994, 86:1-13.

(Continued)

*Primary Examiner*—Helen Kwok
(74) *Attorney, Agent, or Firm*—Canady & Lortz (57) ABSTRACT

The present invention discloses a resonator gyroscope comprising a vibrationally isolated resonator including a proof mass, a counterbalancing plate having an extensive planar region, and one or more flexures interconnecting the proof mass and counterbalancing plate. A baseplate is affixed to the resonator by the one or more flexures and sense and drive electrodes are affixed to the baseplate proximate to the extensive planar region of the counterbalancing plate for exciting the resonator and sensing movement of the gyroscope. The isolated resonator transfers substantially no net momentum to the baseplate when the resonator is excited.

22 Claims, 6 Drawing Sheets

U.S. PATENT DOCUMENTS

| | | |
|---|---|---|
| 6,164,134 A | 12/2000 | Cargille |
| 6,282,958 B1 | 9/2001 | Fell et al. |
| 6,289,733 B1 | 9/2001 | Challoner et al. |
| 6,367,786 B1 | 4/2002 | Gutierrez et al. |
| 6,515,278 B1 | 2/2003 | Wine et al. |
| 6,629,460 B1 | 10/2003 | Challoner |

FOREIGN PATENT DOCUMENTS

| | | |
|---|---|---|
| EP | 0 461 761 A1 | 12/1991 |
| EP | 0 971 208 A2 | 12/2000 |
| WO | WO 96/38710 | 12/1996 |
| WO | WO 98/15799 | 4/1998 |
| WO | WO 00/68640 | 11/2000 |

OTHER PUBLICATIONS

Putty et al., "A Micromachined Vibrating Ring Gyroscope," Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.

ISOLATED RESONATOR GYROSCOPE WITH A DRIVE AND SENSE PLATE

CROSS-REFERENCE TO RELATED APPLICATIONS

This application is a continuation of U.S. patent application Ser. No. 10/370,953, filed Feb. 20, 2003, by A. Dorian Challoner et al., entitled ISOLATED RESONATOR GYROSCOPE WITH A DRIVE AND SENSE PLATE, which is a continuation-in-part application that claims the benefit under 35 U.S.C. §120 of the following and commonly-assigned U.S. utility patent application, which is incorporated by reference herein:

U.S. patent application Ser. No. 09/928,279, filed Aug. 10, 2001, by A. Dorian Challoner, entitled "ISOLATED RESONATOR GYROSCOPE", now U.S. Pat. No. 6,629,460, issued Oct. 7, 2003.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

The present invention relates to gyroscopes, and in particular to improved resonator microgyroscopes and their manufacture. More particularly, this invention relates to microgyroscopes operating with drive and sense electrodes and a vibrationally isolated resonator.

2. Description of the Related Art

Gyroscopes are used to determine direction based upon the sensed inertial reaction of a moving mass. In various forms they are often employed as a critical sensor for vehicles such as aircraft and spacecraft. They are generally useful for navigation or whenever it is necessary to autonomously determine the orientation of a free object.

Older conventional gyroscopes were very heavy mechanisms, employing relatively large spinning masses by current standards. A number of recent technologies have brought new forms of gyroscopes, including optical gyroscopes such as laser gyroscopes and fiberoptic gyroscopes as well as vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined hemispherical resonator gyroscopes (e.g. a Litton hemispheric resonator gyroscope inertial reference unit). However, both of these are very expensive, large and heavy.

In addition, although some prior symmetric vibratory gyroscopes have been produced, their vibratory momentum is transferred directly to their baseplates or packages. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating ring gyroscope, are known to have some desirable isolation and vibrational symmetry attributes, however, these designs are not suitable for or have significant limitations with thin planar silicon microfabrication. The hemispherical resonator employs the extensive cylindrical sides of the hemisphere for sensitive electrostatic sensors and effective actuators, however its high aspect ratio, 3D curved geometry is unsuitable for inexpensive thin planar silicon microfabrication. The thin ring gyroscope while suitable for planar silicon microfabrication lacks electrostatic sensor and actuators that take advantage of the extensive planar area of the device.

Vibration isolation using a low-frequency seismic support is also known (e.g., U.S. Pat. No. 6,009,751, which is incorporated by reference herein), however such increased isolation comes at the expense of proportionately heavier seismic mass and/or lower support frequency. Both effects are undesirable for compact tactical inertial measurement unit (IMU) applications.

Furthermore, the scale of previous silicon microgyroscopes (e.g., U.S. Pat. No. 5,894,090) has not been optimized for navigation grade performance resulting in higher noise and drift than desired. This problem stems from a use of thin epitaxially grown silicon flexures to define critical vibration frequencies that are limited to 0.1% thickness accuracy. Consequently device sizes are limited to a few millimeters. Such designs exhibit high drift due to vibrational asymmetry or unbalance and high rate noise due to lower mass which increases thermal mechanical noise and lower capacitance sensor area which increases rate errors sensor electronics noise.

Scaling up of non-isolated silicon microgyros is also problematic because external energy losses will increase with no improvement in resonator Q and no reduction in case-sensitive drift. An isolated cm-scale resonator with many orders of magnitude improvement in 3D manufacturing precision is required for navigation grade performance.

Conventionally machined navigation grade resonators such as in hemispherical or shell gyros have the optimum scale, e.g. 30 mm and 3D manufacturing precision and hence desirable drift and noise performance, however such gyros are expensive and slow to manufacture. Conventional laser trimming of mechanical resonators can further improve manufacturing precision to some degree, however this process is not suitable for microgyros with narrow mechanical gaps and has limited resolution, necessitating larger electrostatic bias adjustments in the final tuning process.

There is a need in the art for small gyroscopes with greatly improved performance for navigation and spacecraft payload pointing. There is also a need for such gyros to be cheaper and more easily manufactured with greater 3D mechanical precision. There is still further a need for such gyros to have desirable isolation and vibrational symmetry attributes while being compatible with planar silicon manufacturing. Finally, there is a need for such gyros to have a compact, efficient design and optimized placement of drive and sense electrodes exploiting the extensive planar area of the device. Finally, there is a need to mechanically trim the device to subatomic precision without producing debris that may obstruct the capacitance gaps. The present invention satisfies all these needs.

SUMMARY OF THE INVENTION

Embodiments of the invention generally comprise an all-silicon, isolated symmetric vibratory gyroscope that is inexpensive to produce using photolithography and that can be scaled large enough (e.g., approximately 20 mm resonator) to achieve the required performance. Combined with low-cost, closed-loop, analog control electronics, a complete redundant inertial reference unit can be inexpensively manufactured, even when produced in small quantities. Further, when combined with a low-power digital control electronics application-specific integrated circuit (ASIC) for much larger quantities, a "golf ball" sized inertial navigation unit can be produced. Such a compact, lightweight and inexpensive precision inertial reference unit can find a wide range of applications in military as well as commercial products.

One embodiment of the invention provides an isolated symmetric planar resonator that can be fabricated with silicon photolithography. The desired isolation or reactionless vibration of the resonator is achieved by balancing the rocking momentum of the central inertia proof mass element against the rocking momentum of a counterbalancing plate of comparable rocking inertia. The proof mass and counterbalancing plate produce substantially no net momentum transfer or reaction on a mounting baseplate when a resonator differential rocking mode is excited. An isolated resonator microgyroscope is thereby provided having no coupling of its sense or drive mode to baseplate or package motion except through Coriolis accelerations when a differential rocking mode is internally driven. In addition, the inertia distribution of the central proof mass can be designed to have more mass out of plane than the plate in embodiments of the present invention and hence higher angular gain (i.e., Coriolis reaction to inertial rate input). This can be arranged using a thicker plate or by bonding a central post. The resonator may be etched from a single thick silicon wafer including the proof mass or from a thin silicon wafer to which is bonded a post proof mass.

By comparison, previous vibratory gyroscopes with isolated resonators have relied on expensive conventional 3D machining and assembly to achieve isolation. For example, the 3D hemispherical resonator gyroscope must be machined by conventional lathe or other time consuming sequential mass removal method. Simple micromachined gyroscopes without self-isolated design employ external low-frequency isolation mechanisms to gain a degree of isolation at the expense of increasing seismic suspension mass and increased deflections due to gravity loads. Asymmetric tuning fork vibratory gyroscopes provide isolation about the drive axis only and are subject to external disturbance about the output sense axis. The original cloverleaf microgyroscope (e.g., U.S. Pat. No. 5,894,090 to Tang et al.) is susceptible to external rocking disturbances about its drive and output axes.

Significantly, embodiments of the present invention also use the counterbalancing plate as the counter-electrode for the sense and drive electrodes located on the baseplate below. Thus, the counterbalancing plate serves a dual role, forming an isolated resonator with the proof mass and providing a counter-electrode surface for the drive and sense electrodes. To enhance the operation of the gyroscope, the counterbalancing plate is structured with extensive planar surface regions allowing comparably extensive and effective electrodes for electrostatic driving and sensing disposed on the baseplate below the resonator plate.

A typical embodiment of the invention comprises an isolated resonator including a proof mass, a counterbalancing plate having an extensive planar region, and one or more flexures interconnecting the proof mass and counterbalancing plate. A baseplate is affixed to the resonator by the one or more flexures and drive and sense electrodes are affixed to the baseplate proximate to the extensive planar region of the counterbalancing plate for exciting the resonator and sensing movement of the gyroscope. The isolated resonator transfers substantially no net momentum to the baseplate when the resonator is excited. In further embodiments isolation of the resonator is enhanced with additional isolation flexures supporting the baseplate on a mounting frame.

A typical method of producing a resonator gyroscope of the invention comprises providing an isolated resonator including a proof mass, a counterbalancing plate having an extensive planar region, and one or more flexures interconnecting the proof mass and counterbalancing plate. Next, sense and drive electrodes are affixed to the baseplate. Then, the method further comprises affixing the resonator to a baseplate by the one or more flexures such that the drive and sense electrodes are disposed proximate to the extensive planar region of the counterbalancing plate and wherein the isolated resonator transfers substantially no net momentum to the baseplate when the resonator is excited.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

All vibratory gyroscopes employ a rotation sensing mechanical element which is driven to oscillate in a first mode, i.e. the input or drive mode. A Coriolis acceleration of the element under rotation induces energy transfer from the input mode to a second mode, i.e. the output or sense mode. The second mode produces an excitation in the sense element which is then detected. Optimum performance of a vibratory gyroscope is obtained when the drive and sense modes have the same resonant frequency and a high Q factor. The response to the Coriolis acceleration is then mechanically amplified by the Q factor of the resonance and provides improved sensor performance. Closed loop control of the resonator sense mode (e.g. co-pending U.S. application Ser. No. 09/488,425, now U.S. Pat. No. 6,360,601, issued Mar. 28, 2003, which is hereby incorporated by reference herein) provides Coriolis force-rebalance, sense mode damping and wide gyroscope bandwidth.

The present invention provides an affordable vibratory gyroscope with navigation grade performance by means of a precision isolated symmetric planar resonator of optimum scale that can be fabricated with silicon photolithography from commercial double-side polished silicon wafers with low total thickness variation.

Embodiments of the present invention include a resonator comprising two bodies with transverse inertia symmetry about an axis aligned with an input axis and elastically supported so that their axes of symmetry and centers of mass coincide and together form two differential rocking modes of vibration transverse to the axis of symmetry. The two bodies are supported in a case having an inertial rate input axis and exhibit substantially equal frequencies distinct from other modes of vibration, mutually orthogonal and imparting substantially zero net momentum to the case.

In the embodiments which follow, a first one of the bodies is a post proof mass, a second one of the bodies is a counterbalancing plate and the case may include a baseplate. The counterbalancing plate includes planar regions for reacting the drive and sense electrodes disposed underneath the resonator on the baseplate. Other equivalent structures and arrangements will be readily apparent to those skilled in the art.

A key principle of the present invention is that the drive and sense electrodes are disposed to react with the counterbalancing plate. To enhance the effect of this placement, the counterbalancing plate is formed with extensive planar regions to increase the surface area available to react with the electrodes, improving their operation. The drive electrodes are aligned to drive a first one of the differential rocking modes to vibrate. The sense electrodes are aligned to sense the motion of the second differential rocking mode induced by Coriolis accelerations resulting from the inertial rate input and internally driven differential rocking motion about the first mode axis.

2.0 Exemplary Resonator Gyroscope Embodiment

Figure 1:
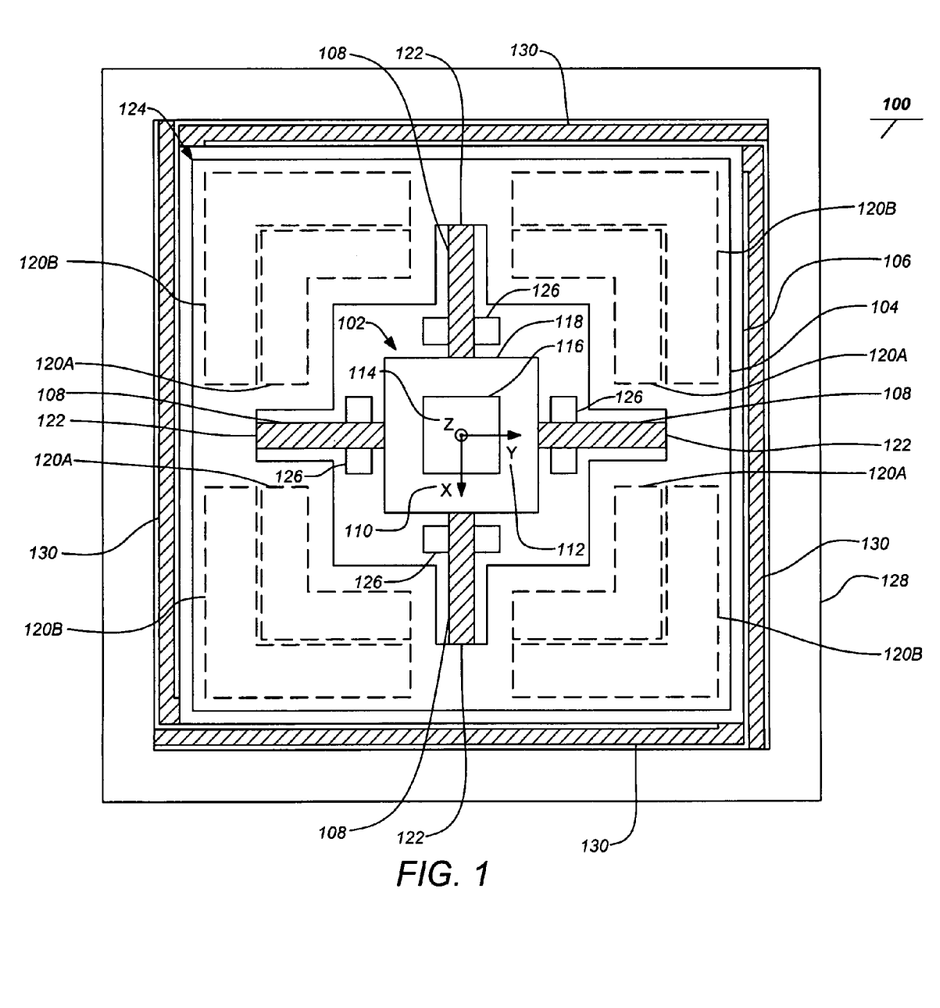
FIG. 1 depicts a top view of an isolated resonator gyroscope of the present invention.

FIG. 1 depicts a top view of a reactionless resonator gyroscope 100 embodiment of the present invention. The gyroscope 100 comprises a baseplate 106 and a unique resonator 124 which includes a post inertial proof mass 102 and a counterbalancing plate 104. The counterbalancing plate 104 has a rocking inertia substantially comparable to that of the inertial proof mass 102 and these two bodies are interconnected and interact as described above. The counterbalancing plate 104 and central proof mass 102 are coupled to the baseplate 106 at four mounting points 126 and interconnected to each other by way of flexures 108. The principal axes of concern which will be referenced throughout the specification are the X axis 110, the Y axis 112 and the Z axis 114 (which is directed out of the page of FIG. 1). Alternately, the counterbalancing plate 104 can also be designed in any other shape, such as a circular ring or other arbitrary shape so long as the two bodies (inertial proof mass 102 and counterbalancing plate 104) interact as previously described.

Figure 2:
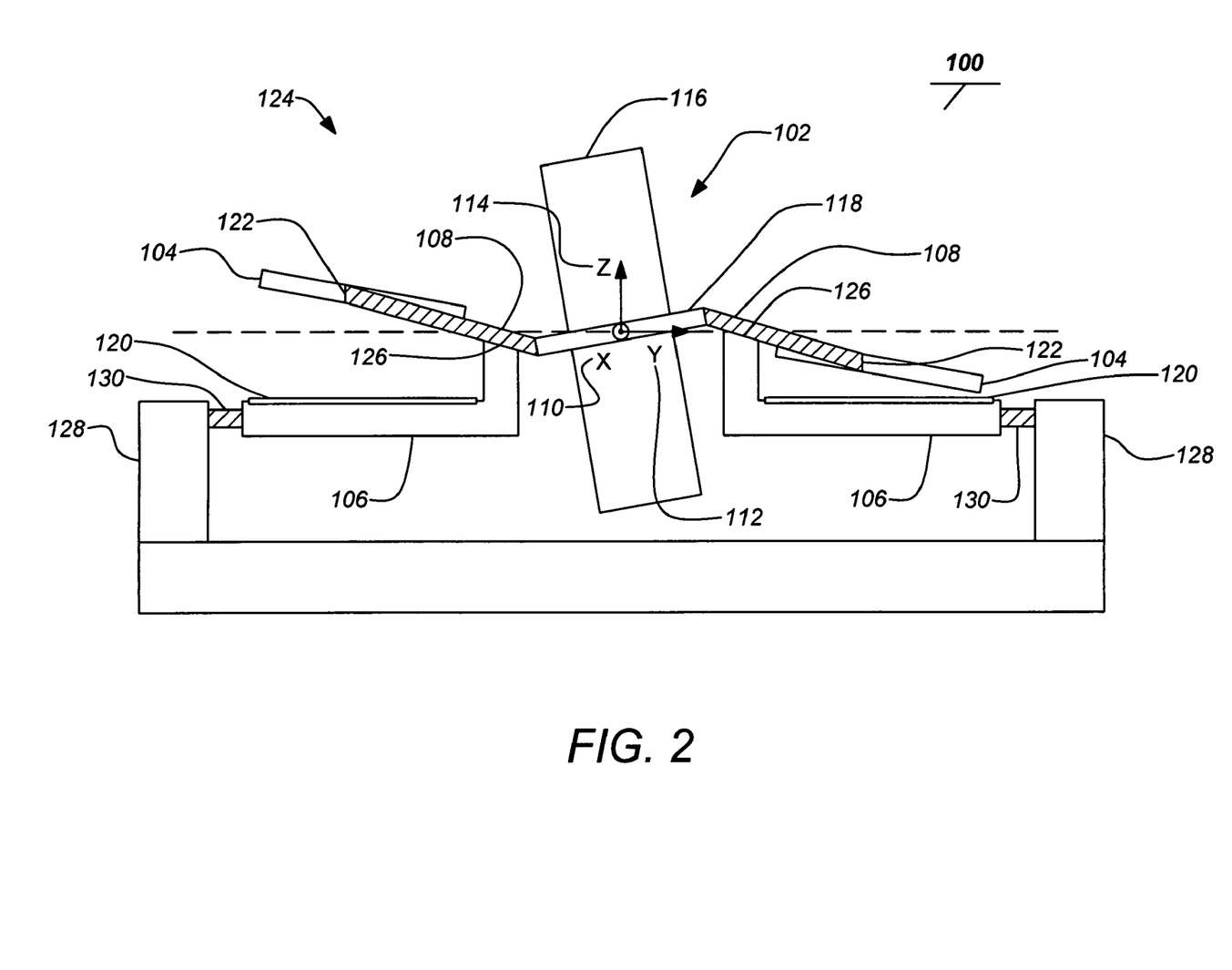
FIG. 2 depicts a side view of an isolated resonator gyroscope of the present invention in a displaced position.

FIG. 2 depicts a side view of a reactionless resonator gyroscope 100 of the present invention in a displaced position. The gyroscope is shown displaced about the X axis 110. The mechanical assembly comprises a central inertial proof mass 102 element interconnected to an outer counterbalancing plate 104 and affixed to a baseplate 106 via elastic beam flexures 108 attached at the four mounting points 126. In one embodiment, the counterbalancing plate 104, flexures 108 and support plate 118 for the central inertial proof mass 102 can be photolithographically etched-through from the same double-side polished crystal silicon wafer to produce a precision planar resonator gyroscope.

The axisymmetric resonator is coupled to a baseplate 106 such that the axisymmetric counterbalancing plate 104 can freely vibrate against the axisymmetric central proof mass 102 with counterbalanced oscillatory rocking motion and results in a distinct differential rocking mode with substantially no momentum transfer to or net reaction on the baseplate 106.

The baseplate 106 may be a relatively thick silicon plate of rigid material. Such a thick rigid baseplate 106 can be directly bonded to the remainder of the gyroscope in a vacuum package. Alternatively, a more flexible thin baseplate 106 may be used to reduce cost and ease assembly with standard wafer processing equipment. Common elasticity in the resonator flexures 108 such as in the attachment to the baseplate 106 and finite inertia of the baseplate provides inherent separation of the differential rocking mode frequency from the common rocking mode of vibration. The singular attribute of any of these arrangements is that any external motion of the gyroscope package cannot excite differential rocking motion of the resonator, unless such motion is first internally driven and only then by virtue of Coriolis accelerations due to rotation of the gyroscope about the input axis or axis of inertial symmetry.

The proof mass 102 can be constructed in various forms, however the inertial distribution of the central proof mass is designed to have significantly more mass out of plane than in plane and hence high angular gain, or Coriolis reaction to inertial rate input with driven rocking motion of the resonator 124. To achieve this, the proof mass 102 comprises a vertical post portion 116 (elongated along the Z axis 114). The post portion 116 is disposed on a small central support plate portion 118 (in the X-Y plane). The post portion 116 and support plate portion 118 can be formed together from a thick silicon wafer for manufacturing ease as previously mentioned. Alternately, the proof mass 102 can be bonded as a separable central post portion 116 to the support plate portion 118 formed from a thin silicon wafer.

The common flexures 108 that connect the central proof mass 102 to both the moving counterbalancing plate 104 and to the fixed baseplate 106 can be photolithographically machined from a single silicon wafer of precise thickness along with the planar outer counterbalancing plate 104 and a central plate portion 118 for mounting a post as the vertical portion 116 as the proof mass 102. The precision planar construction, large planar areas for electrostatic sense and control and favorable mass distribution provide symmetric rocking motion for sensitive tuned vibratory gyroscope operation with ideal mechanical isolation from external disturbances.

2.1 Sense and Drive Counterbalancing Plate

As previously described, embodiments of the present invention utilize the counterbalancing plate to hold the sense and drive electrodes, instead of the "cloverleaf" of the related art (e.g., U.S. Pat. No. 5,894,090).

Electrostatic driving and sensing can be implemented with the drive and sense electrodes 120A, 120B (collectively referred to as electrodes 120) affixed to the baseplate 106 beneath the large planar surfaces of the counterbalancing plate 104. See FIG. 1. The large surface area of the counterbalancing plate 104 is used to react with the driving and sensing electrodes 120. In general, the extensive planar electrode 120 regions are formed on the baseplate 106 beneath the counterbalancing plate 104. The counterbalancing plate 104 structure extends toward the central proof mass 102 beyond the attachment points 122 of flexures 108 to the counterbalancing plate 104 as shown in FIG. 1 to maximize the useful area. Thus, the gap between the proof mass 102 and the counterbalancing plate 104 is reduced and the counterbalancing plate 104 obtains a more plate-like configuration.

Also as shown in FIG. 1, a typical arrangement of the drive and sense electrodes 120A, 120B is for the drive electrodes 120A to be disposed nearer to the proof mass 102 than the sense electrodes 120B; one drive electrode 120A and one sense electrode 120B each are disposed on the baseplate 106 under each quarter segment of the counterbalancing plate 104. This improves the overall sensitivity of the microgyro 100 as the sense electrodes 120B obtain a larger surface area and the gaps around the periphery of the counterbalancing plate 104 undergo larger displacements relative to the baseplate 106. Other electrode 120 patterns can also be used as well, however. For example, the electrodes 120 can be interwoven.

In addition, to allow greater planar area of the counterbalancing plate for the drive and sense electrodes, the flexures 108 can be supported by the baseplate 106 off-center. As shown in FIG. 1, the baseplate 106 supports the flexures 108 at points nearer to the proof mass 102 than the attachment points 122 to the counterbalancing plate 104.

2.2 Resonator Flexures and Integral Baseplate Isolation

Many configurations of the isolated resonator are possible by varying the resonator flexure 108 layout. Different embodiments of the present invention can also employ the resonator flexures 108 arranged in different patterns. For example, as shown in FIG. 1, the resonator flexures 108 are arranged to extend in a radial direction from the proof mass 102 to the counterbalancing plate 104. In other embodiments, the flexures 108 can also be arranged to extend around a perimeter of the proof mass 102 (still interconnecting the proof mass 102 and the counterbalancing plate 104). In addition, hybrids are also possible with some flexures 108 extending in a radial direction and others extending around a perimeter.

Furthermore, embodiments of the present invention can also incorporate integral vibration isolation to the baseplate 106 to further improve differential and common rocking mode frequency separation and vibration isolation of the resonator 124. In these embodiments, a mounting frame 128 is attached to the baseplate 106 through one or more isolation flexures 130. In this case, the baseplate 106 isolation of the resonator 124 is primarily considered with respect to the mounting frame 128 with the baseplate 106 serving as an additional isolating element. For example, the baseplate 106 isolation flexure 130 width and/or length can be set to attenuate axial or rocking vibrations above 500 Hz from the case. In the embodiment shown in FIGS. 1 and 2 the isolating flexures 130 extend around a perimeter of the baseplate 106, attached to the baseplate 106 at a first end and the mounting frame 128 at a second end (illustrating flexures extending around a perimeter as described above). As previously discussed with respect to the resonator flexures 108, radial flexure layouts and hybrids can similarly be used for the isolation flexures 130.

In addition, other implementations of the invention are also possible in which the flexures 108, 130 are not necessarily discrete elements but rather built into the counterbalancing plate 104, proof mass 102, baseplate 106 and/or mounting frame 128. In any case, the essential requirement is that there be substantially no net reaction or momentum transfer to the baseplate.

3.0 Producing a Practical Isolated Resonator Gyroscope

Figure 3:
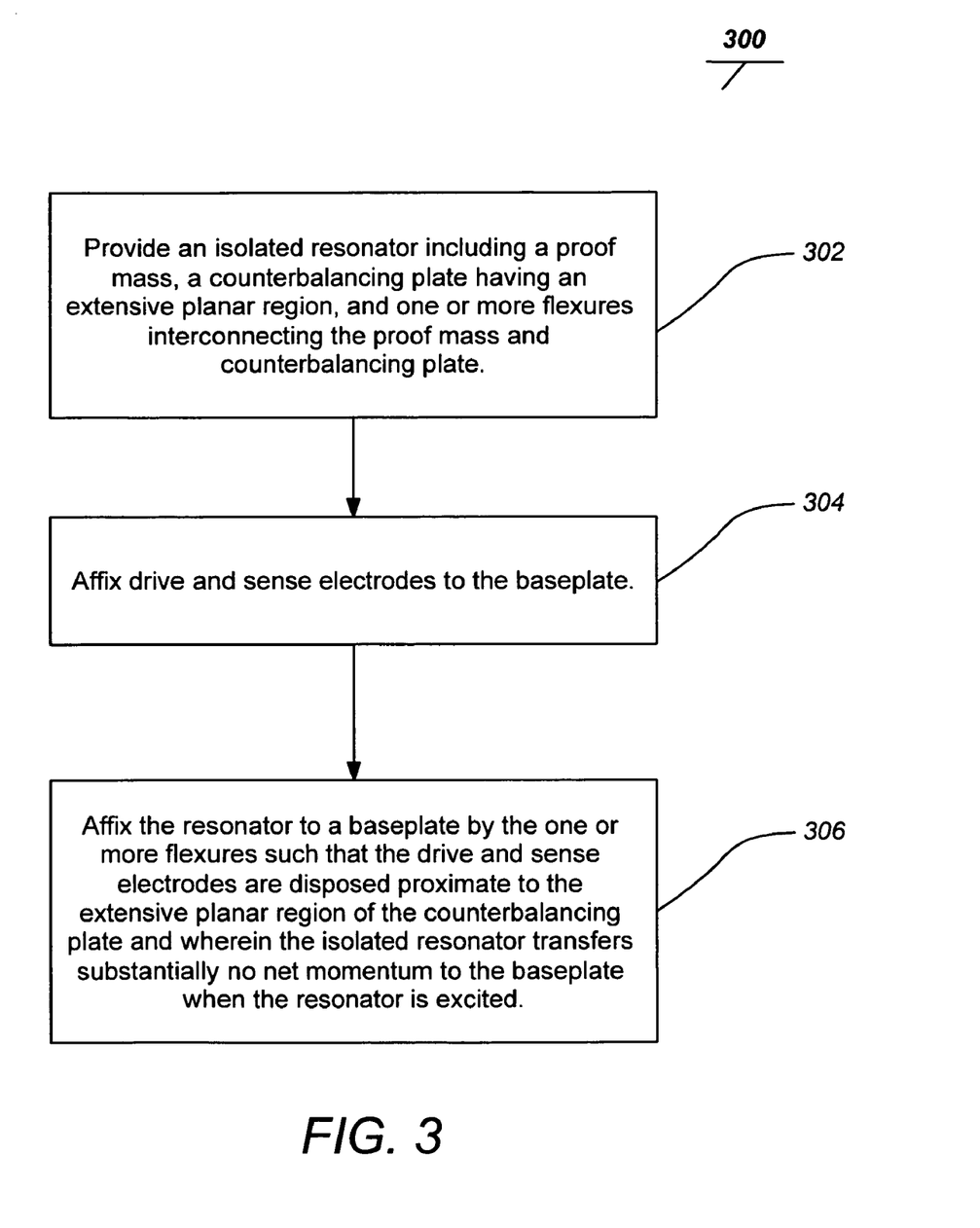
FIG. 3 is a flowchart of a typical method of producing an isolated resonator gyroscope of the invention.

FIG. 3 is a flowchart of a typical method 300 producing an isolated resonator gyroscope of the invention. The method comprises providing an isolated resonator 124 including a proof mass 102, a counterbalancing plate 104 having an extensive planar region, and one or more flexures 108 interconnecting the proof mass 102 and counterbalancing plate 104 at block 302. Next at block 304, sense and drive electrodes 120 are affixed to the baseplate 106. At block 306, the method 300 further comprises affixing the resonator 124 to a baseplate 106 by the one or more flexures 108 such that the drive and sense electrodes are disposed proximate to the extensive planar region of the counterbalancing plate and wherein the isolated resonator 124 transfers substantially no net momentum to the baseplate 106 when the resonator 124 is excited. For example, the resonator 124 can be etched from conductive doped silicon and rigidly and conductively bonded to the baseplate using gold—gold thermo-compression bonding or gold-silicon eutectic bonding.

Providing the resonator 124 may also comprise etching the entire proof mass 102 and counterbalancing plate 104 from a single silicon wafer or etching only a plate portion 118 and the counterbalancing plate 104 from the silicon and bonding on a separate vertical post portion 116 as the proof mass 102. A gold—gold thermo-compression bond for a silicon post or anodic bond for a pyrex post can be used with critical precision bonding surfaces and dimensions defined by planar polishing.

Conventional silicon processing can be employed for both resonator and baseplate wafers. The resonator can be manufactured from a doped, double-side polished, plain 500-micron silicon wafer with preferably less than 1 micron total thickness variation (TTV) specification. The baseplate can be a commercial 500-micron silicon wafer with a 26 to 50 micron epitaxial silicon layer or silicon-on-insulator (SOI) layer for the gap spacer. Alternatively, a plain wafer with an etched electrode well can be used. Definition of the resonator flexures 108 and baseplate 106 flexures can be performed with commercial deep reactive ion etching equipment. Alignment and attachment of the inertial proof mass 102 with visual optical precision is sufficient, based on FEM analysis and experience with related art MEMS cloverleaf gyros.

The principle of operation of the resonator gyroscope is that the proof mass rocks against the counterbalancing plate with equal an opposite momentum. Thus, an exemplary gyroscope 100 can be made from a planar 550 micron thick silicon wafer, the resonator 124 comprises a 7.5 mm×7.5 mm plate (central plate portion 118) with 10.5 mm×3 mm×3 mm silicon posts (proof mass 102) bonded to both sides. The rocking inertia of the proof mass 102 can be approximately $I_r$=0.014 kg-mm$^2$ and the axial inertia approximately $I_z$=0.0060 kg-mm$^2$. The angular gain for Coriolis sensing is approximately $1-I_z/I_r/2 \sim 1$ (comparable to an ideal Foucault pendulum). The angular gain for the flat plate is approximately 0 so the effective angular gain for the gyroscope is approximately 0.5, comparable to the typical value of 0.3 for a hemispherical or shell resonator. For reactionless operation, the rocking inertia of the counterbalancing plate 104 substantially matches that of the proof mass 102, $I_r$. The center of mass of the proof mass 102 and counterbalancing plate 104 are thus coincident at the center of the resonator 124. Acceleration of the gyroscope 100 thus produces substantially no excitation of the differential rocking modes.

The elastic flexures 108, used to attach the central plate portion 118 and counterbalancing plate 104 to the rigid baseplate 106, can have approximately a 0.55 mm square cross section, fabricated by photolithography. The attachment and lengths of the elastic elements 108 to the baseplate 124 can be determined through a finite element analysis, such as described hereafter.

An analysis of the free modes of vibration of the resonator 124 attached to a 3 mm thick 3 inch diameter silicon wafer identified two, degenerate counter-rocking modes of the counterbalancing plate 104 against the proof mass 102 at approximately 4,295.77 Hz. The momentum transmitted to the baseplate 106 is found to be approximately $\frac{1}{150}$ that of a rocking momentum in the proof mass 102. By comparison, with a locked plate or frame as in designs such as that of U.S. Pat. No. 5,894,090, all of the rocking momentum would be transmitted to the baseplate wafer. Further examination of the finite element model results reveals how the balance is achieved about the X axis of a baseplate 106 in this particular case: first, there is substantially no net in-plane torsion or normal force at each of the baseplate 106 support points along the X axis; second, the residual in-plane torsion reactions at each of the flexure 108 attachments along the Y axis are counterbalanced at any point in the baseplate 106 by the net moment due to the normal force also acting at these attachments. This demonstrates an approximately 150 fold improvement in mechanical isolation without resort to low frequency seismic isolation methods. The perfection of the balance and isolation is limited only by planar geometric design and fabrication precision and not by the size of the baseplate 106 mass and its suspension frequency from the gyro case.

The present invention is appropriate for navigation grade vibratory gyroscopes in rugged environments. The isolation of the two rocking modes from rigid baseplate motion ensures that modal damping and associated gyroscope rate drift will be determined primarily by the losses within the precision machined silicon resonator and not by the much less precise external packaging losses. The inherent high Q of bulk crystal silicon and the excellent symmetry which has been demonstrated through photolithography of precision double-side polished silicon wafers at mesoscale can be exploited with the present invention to achieve excellent navigation grade vibratory gyroscope performance at low cost.

It should also be understood that to achieve the full potential of low drift and noise performance using this isolated resonator principle will require even high final 3D mechanical precision than afforded by the precise wafer polishing, through-etched silicon micromachining and high quality silicon bonding outlined above. This can be preferably accomplished with this design by focused ion beam trimming, after the assembly of the resonator onto its baseplate, of the dimensions of the elastic beam elements or the mass elements of the resonator, e.g. plate or post. This post assembly trimming can take advantage of the highly sensitive built in capacitive sensors to increase the degree of initial isolation and tuning to subatomic precision. Electrostatic bias trimming to modify the overall modal stiffness with the built in capacitance electrodes or special purpose electrodes can be used to maintain this isolation and tuning after vacuum packaging and at varying temperatures throughout the life of the gyroscope.

4.0 Isolated Resonator Gyroscope Model

Figure 4:
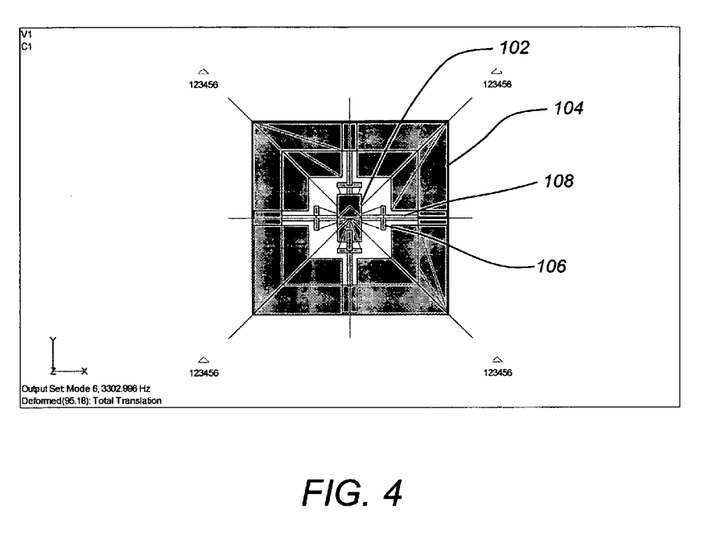
FIG. 4 depicts a plan view of an exemplary reactionless planar resonator gyroscope model.

FIG. 4 depicts a view of an isolated planar resonator gyroscope model. As previously detailed, the mechanical assembly comprises a resonator 124 and baseplate 106. The resonator 124 comprises a central inertia proof mass 102 element attached to a planar counterbalancing plate 104 and to a baseplate 106 via elastic beam flexure elements 108. The planar counterbalancing plate 104 inertia matches the proof mass 102 rocking inertia. Both can be fabricated from polished crystal silicon so that their inertias can be set approximately equal by geometric design.

Differential rocking of a post proof mass 102 against the planar counterbalancing plate 104 provides the two desirable degenerate, reactionless modes of vibration for sensing inertial rate with high mechanical gain. The high angular gain of the elongated post proof mass 102 versus the counterbalancing plate 104 provides high sensitivity to Coriolis force and hence an inertial rate normal to plane. The baseplate carries the short (approximately 15-micron) pillars for attachment of the resonator flexures 108 and provision of the capacitance gap for baseplate electrodes to drive and sense the vibration of the planar counterbalancing plate 104 of the resonator 124.

The baseplate 106 also provides the integral vibration isolation and outer mounting frame for packaging. Preferably, the resonator is etched from the same double-side polished crystal silicon wafer without the vertical portion 116 of the inertia proof mass 102. In addition, the baseplate 106 is also preferably etched from a silicon wafer with standard semiconductor processing. Since the baseplate 106 does not move by virtue of the disclosed resonator isolation method its mechanical precision is less critical.

Figure 5:
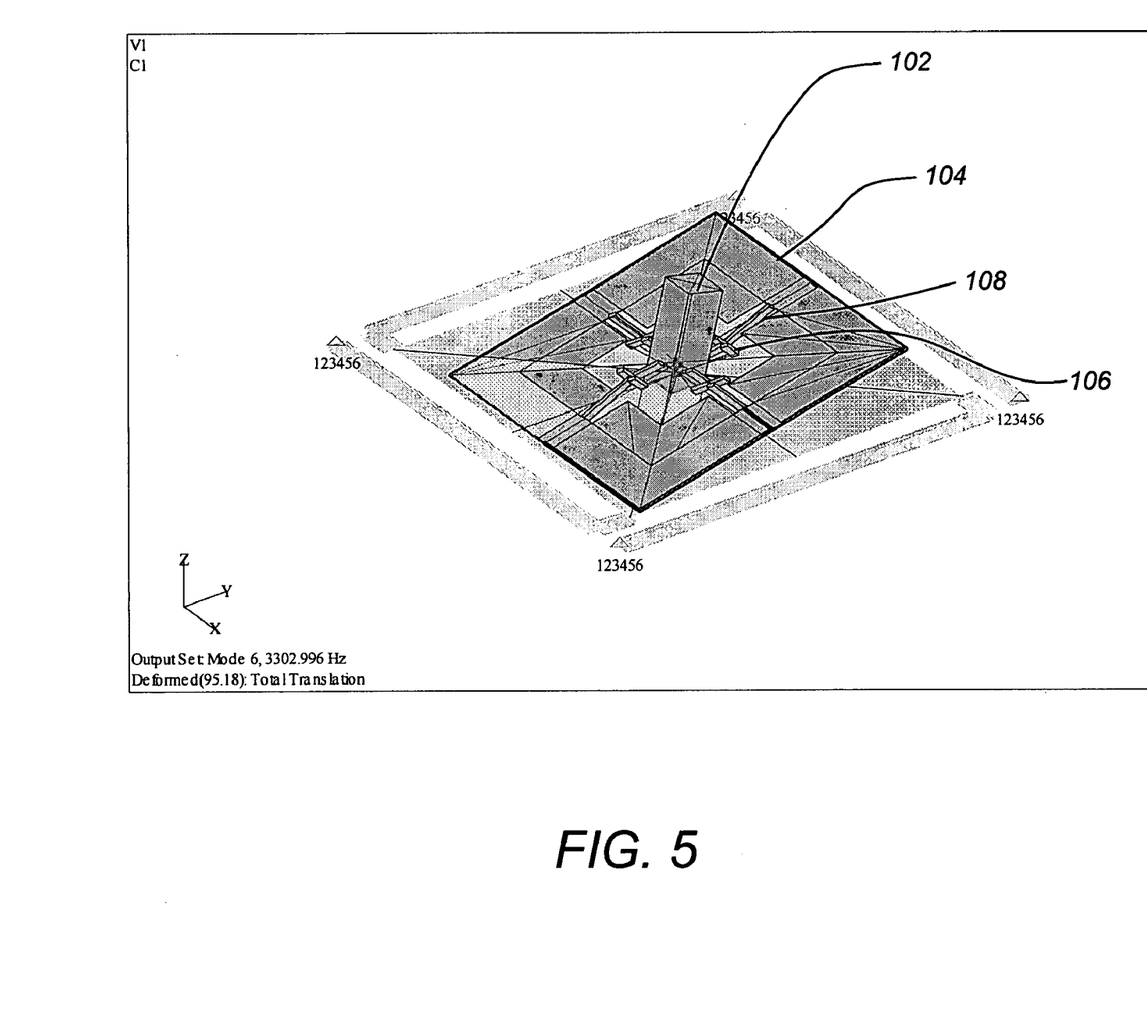
FIG. 5 illustrates a differential rocking mode about the X axis for an exemplary reactionless planar resonator gyroscope model.
Figure 6:
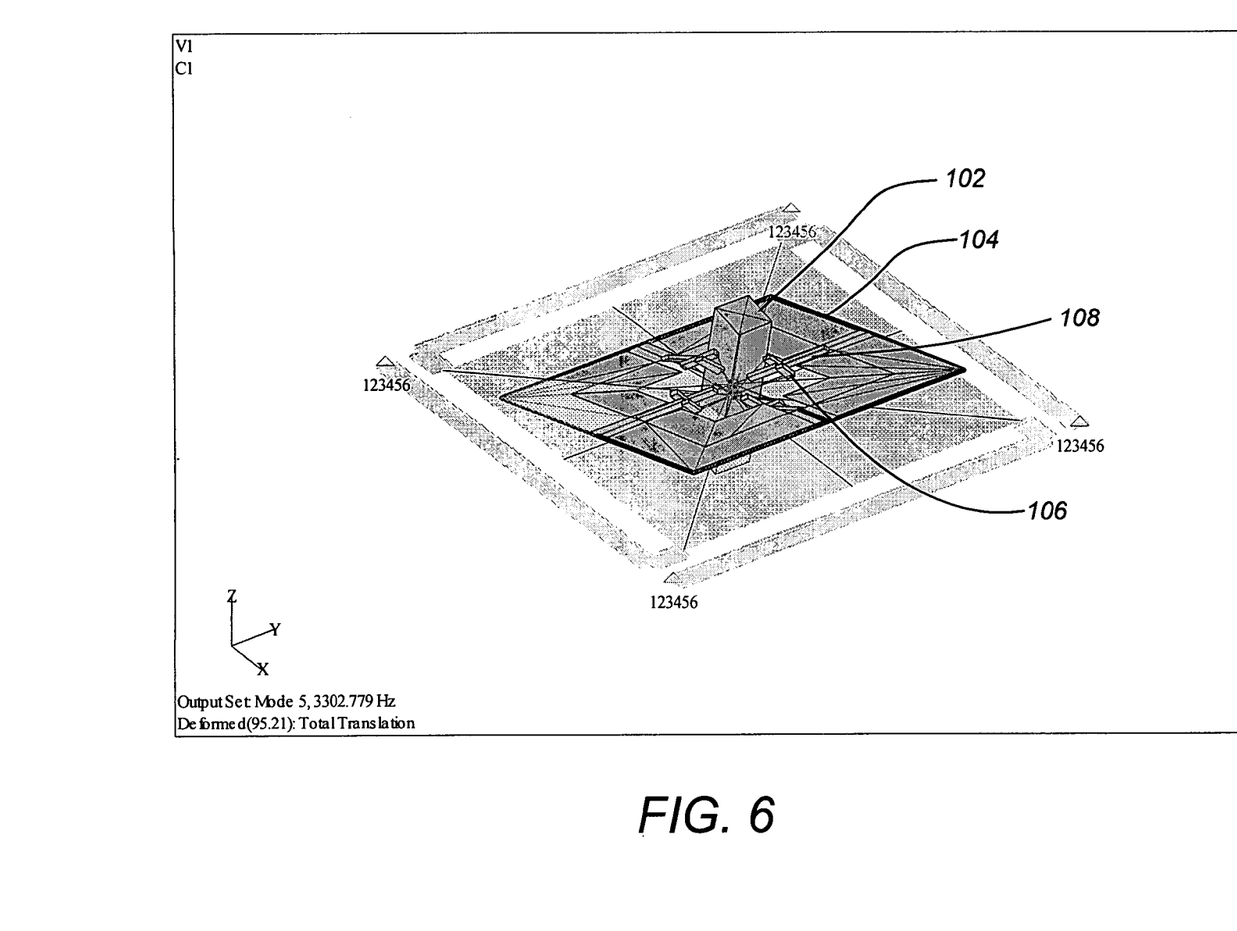
FIG. 6 illustrates a differential rocking mode about the Y axis for an exemplary reactionless planar resonator gyroscope model.

FIGS. 5 and 6 illustrate the key differential rocking modes about the X and Y axes, respectively. In a practical simulation, the model obtains momentum isolation of approximately $10^{-4}$ with approximately 1 micron error in beam length. The resulting frequency split was approximately 0.2 Hz. Current micromachining error is estimated to be less than 100 nm over 2 cm in the lateral X and Y directions. Error of less than 10 nm on 500 micron thickness is estimated in the Z direction as confirmed by optical metrology. Resonators have been machined with measured rocking mode frequency splits less than 0.1 Hz, without posts.

The FEM analysis used to generate FIGS. 4–6 comprised simple beam elements for the key resonator flexures 108 and baseplate isolation flexures 130, hexahedral solid elements for the inertia proof mass 102 and rigid mass elements for the planar counterbalancing plate 104, central support plate portion 118 and baseplate 106. Construction lines for plot only elements defining the counterbalancing plate 104 of the resonator 124 are visible in the FIGS. 4–6 but have no structural significance. A refined model using plate elements for the counterbalancing plate 104 and central baseplate 106, and solid hexahedral elements for the inertia proof mass 102, can be used for a more precise geometry definition prior to final photo-mask generation.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A resonator gyroscope, comprising:
an isolated resonator including:
a proof mass;
a counterbalancing plate having a planar region; and
one or more flexures interconnecting the proof mass and the counterbalancing plate;
where the planar region extends toward the proof mass beyond attachment points of the one or more flexures interconnected to the counterbalancing plate;
a baseplate affixed to the resonator by the one or more flexures; and
drive and sense electrodes affixed to the baseplate proximate to the planar region of the counterbalancing plate for exciting the resonator and sensing movement of the gyroscope;
wherein the isolated resonator transfers substantially no net momentum to the baseplate when the resonator is excited.

2. The resonator gyroscope of claim 1, wherein the proof mass and the counterbalancing plate each have a center of mass and transverse inertia symmetry about an axis that are substantially coincident and the proof mass and the counterbalancing plate together form two differential rocking modes of vibration transverse to the axis with substantially equal frequencies.

3. The resonator gyroscope of claim 1, wherein the baseplate is rigid.

4. The resonator gyroscope of claim 1, wherein the baseplate is flexible.

5. The resonator gyroscope of claim 1, wherein the counterbalancing plate has a rocking inertia substantially comparable to that of the proof mass.

6. The resonator gyroscope of claim 1, wherein the one or more flexures are integral to the counterbalancing plate.

7. The resonator gyroscope of claim 1, wherein the proof mass, the counterbalancing plate and the baseplate are machined from silicon.

8. The resonator gyroscope of claim 1, wherein the proof mass comprises a vertical portion and a central plate portion.

9. The resonator gyroscope of claim 8, wherein the one or more flexures are integral to the central plate portion.

10. The resonator gyroscope of claim 8, wherein the central plate portion, the one or more flexures and the counterbalancing plate are produced by through-etching a precision-polished silicon wafer.

11. The resonator gyroscope of claim 8, wherein the vertical portion is a separate element bonded to the central plate portion.

12. A method of producing a resonator gyroscope, comprising the steps of:
providing an isolated resonator including:
a proof mass;
a counterbalancing plate having a planar region; and
one or more flexures interconnecting the proof mass and the counterbalancing plate;
where the planar region extends toward the proof mass beyond attachment points of the one or more flexures interconnected to the counterbalancing plate;
affixing drive and sense electrodes to a baseplate; and
affixing the resonator to the baseplate by the one or more flexures such that the drive and sense electrodes are disposed proximate to the planar region of the counterbalancing plate;
wherein the isolated resonator transfers substantially no net momentum to the baseplate when the resonator is excited.

13. The method of claim 12, wherein the proof mass and the counterbalancing plate each have a center of mass and transverse inertia symmetry about an axis that are substantially coincident and the proof mass and the counterbalancing plate together form two differential rocking modes of vibration transverse to the axis with substantially equal frequencies.

14. The method of claim 12, wherein the baseplate is rigid.

15. The method of claim 12, wherein the baseplate is flexible.

16. The method of claim 12, wherein the counterbalancing plate has a rocking inertia substantially comparable to that of the proof mass.

17. The method of claim 12, wherein the one or more flexures are produced integral to the counterbalancing plate.

18. The method of claim 12, wherein the proof mass, the counterbalancing plate and the baseplate are machined from silicon.

19. The method of claim 12, wherein the proof mass comprises a vertical portion and a central plate portion.

20. The method of claim 19, wherein the one or more flexures are integral to the central plate portion.

21. The method of claim 19, wherein the central plate portion, the one or more flexures and the counterbalancing plate are produced by through etching a precision-polished silicon wafer.

22. The method of claim 19, wherein the vertical portion is a separate element from the central plate portion and the proof mass is provided by bonding the vertical portion to the central plate portion.

* * * * *